(12) United States Patent
Loscrudato et al.

(10) Patent No.: US 10,961,965 B2
(45) Date of Patent: Mar. 30, 2021

(54) METHOD OF MODIFYING A CONVENTIONAL DIRECT INJECTOR AND MODIFIED INJECTOR ASSEMBLY

(71) Applicants: NOSTRUM ENERGY PTE. LTD., Singapore (SG); Frank S. Loscrudato, Ann Arbor, MI (US); Osanan L. Barros Neto, Commerce Township, MI (US)

(72) Inventors: Frank S. Loscrudato, Ann Arbor, MI (US); Osanan L. Barros Neto, Commerce Township, MI (US)

(73) Assignee: NOSTRUM ENERGY PTE. LTD., Singapore (SG)

(*) Notice: Subject to any disclaimer, the term of this patent is extended or adjusted under 35 U.S.C. 154(b) by 89 days.

(21) Appl. No.: 15/768,281

(22) PCT Filed: Oct. 13, 2016

(86) PCT No.: PCT/US2016/056777
§ 371 (c)(1),
(2) Date: Apr. 13, 2018

(87) PCT Pub. No.: WO2017/066407
PCT Pub. Date: Apr. 20, 2017

(65) Prior Publication Data
US 2018/0298860 A1  Oct. 18, 2018

Related U.S. Application Data (60) Provisional application No. 62/242,660, filed on Oct. 16, 2015.

(51) Int. Cl.
*F02M 61/16*  (2006.01)
*F02M 61/06*  (2006.01)
(Continued)

(52) U.S. Cl.
CPC ............ *F02M 61/168* (2013.01); *B23P 6/00* (2013.01); *B23P 15/001* (2013.01); *B23P 15/16* (2013.01);
(Continued)

(58) Field of Classification Search
CPC .. F02M 61/18; F02M 61/168; F02M 61/1853; F02M 61/186; F02M 63/0077;
(Continued)

(56) References Cited

U.S. PATENT DOCUMENTS 4,869,429 A * 9/1989 Brooks ................. F02M 61/16
239/473
4,907,745 A * 3/1990 Messingschlager ... F02M 65/00
239/463
(Continued)

FOREIGN PATENT DOCUMENTS

| CN | 102410121 A | 4/2012 |
|---|---|---|
| JP | 1061461 U1 | 4/1989 |
| JP | 2011-196326 A | 10/2011 |

OTHER PUBLICATIONS

Extended Supplementary European Search Report dated Jun. 11, 2019 in European Patent Application No. 16 85 6162.9.
(Continued)

*Primary Examiner* — Qingzhang Zhou
*Assistant Examiner* — Christopher R Dandridge
(74) *Attorney, Agent, or Firm* — Scully Scott Murphy and Presser; Tanzina Chowdhury (57) ABSTRACT

The present disclosure relates to a method of modifying a conventional injector (e.g., a high pressure direct fuel injector) and to the modified injector resulting therefrom. The modified injector provides a fluid flow rate and/or fluid spray plume (i.e., pattern) which is different than the fluid flow rate and/or fluid spray plume (i.e., pattern) of the original con-
(Continued)

ventional injector. In one embodiment, provided is a modified injector used in internal combustion engines for fuel delivery directly into the combustion chamber.

32 Claims, 8 Drawing Sheets

(51) Int. Cl.
*F02M 61/18* (2006.01)
*B23P 15/16* (2006.01)
*B23P 6/00* (2006.01)
*B23P 15/00* (2006.01)

(52) U.S. Cl.
CPC ............ *F02M 61/06* (2013.01); *F02M 61/18* (2013.01); *F02M 61/1853* (2013.01); *F02M 2200/8069* (2013.01); *F02M 2200/8084* (2013.01)

(58) Field of Classification Search
CPC ....... F02M 2200/80; F02M 2200/8069; F02M 2200/8084; F02M 2200/8023; F02M 2200/803; F02M 2200/8061; F02M 2200/8076; B23P 15/001; B23P 15/16; B23P 6/00
See application file for complete search history.

(56) References Cited

U.S. PATENT DOCUMENTS

| | | | |
|---|---|---|---|
| 4,907,748 A * | 3/1990 | Gardner | F02M 51/0603 239/584 |
| 4,925,110 A | 5/1990 | Takeda et al. | |
| 4,982,716 A | 1/1991 | Takeda et al. | |
| 5,062,573 A | 11/1991 | Makimura | |
| 5,203,308 A * | 4/1993 | Liskow | F02M 67/00 123/531 |
| 5,224,458 A | 7/1993 | Okada et al. | |
| 5,301,879 A | 4/1994 | Takeda et al. | |
| 5,520,157 A | 5/1996 | Pontoppidan | |
| 5,597,121 A | 1/1997 | Munezane et al. | |
| 5,718,387 A | 2/1998 | Awarzamani | |
| 5,772,122 A | 6/1998 | Sugiura et al. | |
| 5,810,264 A | 9/1998 | Yost | |
| 5,904,299 A | 5/1999 | Hans et al. | |
| 5,921,473 A | 7/1999 | Romann | |
| 6,092,741 A | 7/2000 | Sumida | |
| 6,095,437 A | 8/2000 | Nozawa et al. | |
| 6,921,021 B2 | 7/2005 | Nally et al. | |
| 6,997,401 B2 | 2/2006 | Baasch et al. | |
| 7,021,570 B2 * | 4/2006 | Tani | F02M 51/0675 239/533.14 |
| 7,434,752 B2 | 10/2008 | Matsumoto et al. | |
| 7,533,661 B2 | 5/2009 | Baasch | |
| 9,038,599 B2 | 5/2015 | Matsukawa | |

OTHER PUBLICATIONS

International Search Report dated Jan. 12, 2017 issued in PCT/US2016/056777.
Official Action dated Jun. 29, 2020, received from the Japanese Patent Office with English language Translation.
Official Action dated Mar. 20, 2020, received from the Chinese Patent Office with English Translation.
English Translation of Official Action dated Mar. 20, 2020, received from the Chinese Patent Office.
Official Action dated Oct. 27, 2020, received from the Japanese Patent Office with English language translation.

* cited by examiner

PRIOR ART

Figure 1

PRIOR ART

Figure 2

PRIOR ART

METHOD OF MODIFYING A CONVENTIONAL DIRECT INJECTOR AND MODIFIED INJECTOR ASSEMBLY

CROSS-REFERENCE TO RELATED APPLICATIONS

This application claims the benefit of U.S. Provisional Application No. 62/242,660 filed on Oct. 16, 2015, and is a '371 of International Application No. PCT/US2016/056777, filed on Oct. 13, 2016, the entire contents of both of which are incorporated herein by reference.

FIELD OF THE DISCLOSURE

The present disclosure relates to a method of modifying a conventional injector (e.g., a high pressure direct fuel injector) and to the modified injector resulting therefrom. The modified injector provides a fluid flow rate and/or fluid spray plume (i.e., pattern) which is different than the fluid flow rate and/or fluid spray plume (i.e., pattern) of the original conventional injector. In one embodiment, provided is a modified injector used in internal combustion engines for fuel delivery directly into the combustion chamber.

BACKGROUND OF THE DISCLOSURE

Delivering fuel directly into the combustion chamber of a modern internal combustion engine is an important aspect of modern engine design and an important aspect regarding operation of spark-ignited or compression-ignited engines. The advantages of gasoline direct injection ("GDI") versus port gasoline injection ("PFI") are increased fuel efficiency and higher specific power output. Exhaust gas emissions levels can also be more accurately controlled with direct injection systems. Direct fuel injection, or Gasoline Direct Injection, now commonly used in modern multi-cylinder gasoline engines in the transportation industry, can enable up to a 12% fuel consumption improvement versus low pressure port fuel injection systems. North American light-duty vehicle market penetration of direct injected engines sold in new vehicles has grown from approximately 3% in 2008 to approximately 30% in 2013 and beyond in 2015. The global automotive market for gasoline direct injection is projected to grow at a compounded annual growth rate of 18% by 2018.

Figure 1:
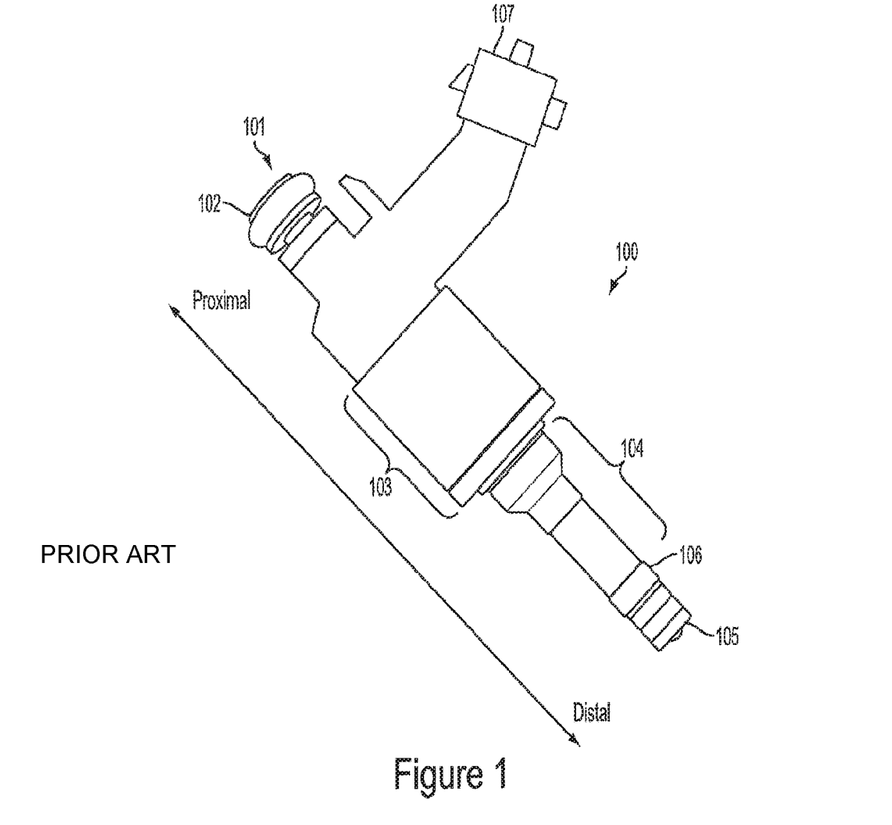
FIG. 1 is an image of a conventional high pressure gasoline direct injector.

In a gasoline direct injection system, gasoline is supplied via a low pressure pump, usually operating at 3-6 bar (40 psi to 90 psi), to a high pressure piston pump, usually located on the cylinder head of an internal combustion engine. The high pressure piston pump is usually driven by the camshaft via a tri-lobe or quad-lobe gear and the high pressure piston pump supplies fuel at high pressure, usually from 130 bar to 350 bar (2,000 psi to 5,000 psi), to a fuel distribution rail. The fuel distribution rail is usually mounted to the cylinder head or intake manifold, along the longitudinal access of an engine, in alignment with a bank of cylinders. FIG. 1 is an image of a conventional high pressure gasoline direct injector 100. The direct fuel injector 100 is in fluid supply with the distribution fuel rail at proximal end 101 thereof. The direct fuel injector 100 is provided with fluid seal 102. The direct fuel injector 100 is installed in the engine, usually in the cylinder head, at a specific orientation to the combustion chamber, where the solenoid body 103 of the direct fuel injector 100 and the pintle shaft 104 are housed within the cylinder head injector bore, in order to inject fuel directly into the combustion chamber via the nozzle 105 at the distal end of the direct fuel injector 100. The direct fuel injector 100 is sealed to the combustion chamber via the Fluoropolymer seal 106. A multi-cylinder engine typically uses a plurality of such direct fuel injectors.

Figure 2:
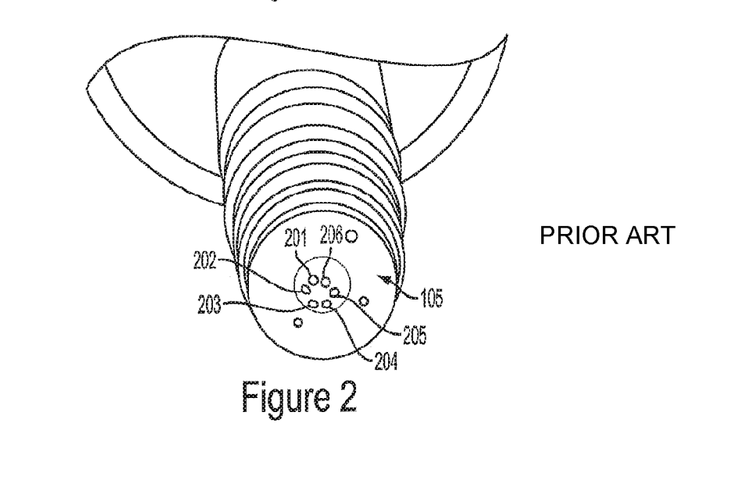
FIG. 2 is an image of the nozzle of the conventional high pressure gasoline direct injector of FIG. 1.

FIG. 2 is a close-up image of the nozzle 105 of the high pressure direct fuel injector 100 at the distal end of the injector, which nozzle 105 has a plurality of orifices 201, 202, 203, 204, 205, 206 which each deliver a flow of fuel into the combustion chamber. The quantity, orientation and size of the orifices is specific to each engine application. Electrical signal and power to the direct fuel injector 100 are delivered via the electrical connector 107. FIGS. 1 and 2 are purely illustrative examples of a common high pressure direct fuel injector. Variations in feature design, dimensions, nozzle geometry, electrical connectors and specifications are commonplace in the market for specific variation to each engine application, resulting in a high degree of design variation and component complexity.

The precise control over the volume of injected fuel, the start of injection ("SOI"), and the injection duration are specifically varied based on engine speed and load inputs. These parameters are controlled on a cycle by cycle basis, through an engine control unit ("ECU") by the engine management system ("EMS"), which EMS system operates mathematical models to precisely output the exact fuel injection parameters. These functions of the ECU require considerably more complex processing and memory, as direct injection and EMS must have very precise algorithms for good performance and drivability.

The benefits of gasoline direct injection are derived not only from the precise fuel metering capability and superior fuel atomization at high pressure, but also from the direct fuel delivery and the associated cooling effects. Unlike a port injection fuel system, where fuel is delivered into an intake air path, the direct injection system does not deposit fuel on the interior walls of the intake track, thereby eliminating losses in consumption and control. Direct injection of fuel to the combustion chamber contributes a significant cooling effect to the intake air charge of an internal combustion engine, which cooling is effective in mitigating knock, or pre-detonation or pre-ignition events, which could be present in a non-direct injected engine, especially at high speed and high load operating conditions. The in-cylinder charge cooling provided by GDI allows direct injection engines to operate at higher geometric compression ratios than their port injected counterparts, increasing cycle efficiency. Also, the lack of a fuel film on the intake manifold walls allows for a broader range of fuel cutoff on engine coasting.

Figure 3:
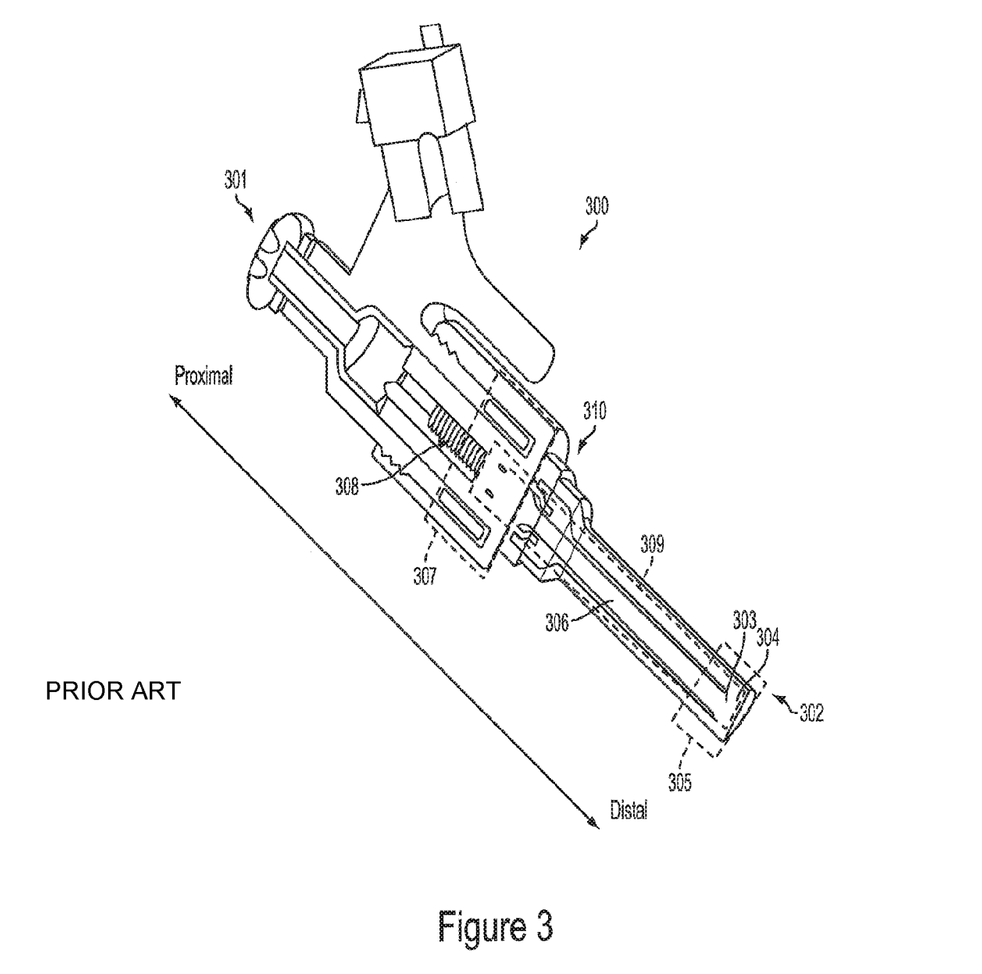
FIG. 3 is a sectional illustration of a conventional high pressure gasoline direct injector.

The conventional gasoline direct injector is a highly precise and precision assembled component. FIG. 3 is a section illustration of the internals of a common high pressure direct injector 300, with proximal end 301 and distal end 302. The direct fuel injector 300 utilizes a pintle ball 303 and conical seat 304 in the nozzle 305 to seal the fluid passage at the tip of the direct fuel injector 300. The pintle ball 303 is mounted to the pintle shaft 306 and is actuated most commonly by a solenoid 307, and in some cases, by a Piezo-electric crystal system. The solenoid 307 is held in the closed position by spring 308, to maintain a closed seal between the pintle ball 303 and conical seat 304. Energizing the solenoid 307 lifts the pintle ball 303 from the conical seat 304 to allow fluid to pass through the nozzle 305 and into the combustion chamber of an engine. The solenoid 307, when energized, moves to a positive stop position within the injector assembly. The stop position is associated with what is commonly referred to as the solenoid gap, which gap is the distance between the longitudinal position of the solenoid when closed and the longitudinal position of the solenoid when energized and seated against the stop. This solenoid gap can range, for example, from 80 microns (0.080 mm) to 500 microns (0.500 mm) in a conventional high pressure gasoline direct injector, and is critical to the flow rate and flow characteristics of the fluid injected into the combustion chamber. The pintle assembly 309, outside housing 310 and the nozzle 305 (from which fluid flows through high precision orifices and in which the pintle conical seat 304 is located) are precisely machined and assembled to tolerances ranging from, for example, 25 micrometers (0.025 mm) to 5 micrometers (0.005 mm). In addition, the conventional direct injectors are designed to provide a specific fuel flow rate and spray plume shape into the combustion chamber. The nozzles are specifically designed and are precision machined for each different engine combustion chamber design. The design diameter of fluid passages in a conventional gasoline direct injection nozzle, as seen in FIG. 2, can range from, for example, 150 micrometers (0.150 mm) to 350 micrometers (0.350 mm) and typically require high precision computer controlled machining centers, or special electron discharge machining centers, or even high precision laser drilling operations to achieve high precision tolerances. The dimensions and tolerances of a modern conventional high pressure gasoline direct injector present a specific challenge to modification of the same.

The high performance aftermarket for conventional low pressure port fuel injection systems is well established. However, the low pressure port injector is a well-known technology and does not require the level of precision or complexity of a direct injector. The complexity of direct injector manufacturing, high precision tolerance performance and engineering challenges have thus far prevented aftermarket modification of the conventional gasoline direct injector. Attempts at disassembly of a conventional direct injector usually result in the destruction of the direct injector. Attempts to add additional holes to an existing nozzle of a direct injector or attempts at enlarging existing holes in a nozzle of a direct injector usually result in damage to the pintle seat seal, rendering the direct injector unusable due to excessive fuel leakage and/or failure to accurately meter fuel. Attempts of simply grinding the nozzle to expose more fluid passages usually result in the destruction of the fluid spray plume pattern, resulting in uncontrollable fuel injection to the combustion chamber, as well as excessive in-cylinder wall wetting, and wetting of the piston ring pockets and crevices.

Attempting to tune gasoline direct injected engines (with the conventional injector flow rate) to generate higher power is difficult. This is because the only available variables that can typically be manipulated (in the case where injector fuel flow rate is not increased) are start of injection time, total injection duration (the open time), and, to a lesser extent, fuel pressure (running into the limitation of the fuel pump's ability to sustain high flow rates at full pressure). A direct injection engine, where the injector injects directly into the cylinder, is limited in injection window to the intake stroke of the piston, or, in crank rotation terms, limited to 180 degrees of the 720 degrees in a four stroke engine cycle. As the engine rotational speed (RPM) increases, the time available to inject fuel decreases. Hence, all other factors being equal, a gasoline direct injected engine needs higher-capacity injectors with the appropriate spray plume characteristics to achieve higher power.

The use of adapters mounted to the nozzle end of a fuel injector, which adapters assist in enhancing the fuel delivery or modifying the fuel delivery intent of the original injector, such as is prevalent with air-assisted adapters (see, e.g., U.S. Pat. Nos. 6,092,741, 4,982,716, 5,224,458, 5,520,157, 5,597,121, 5,772,122, 5,904,299, 6,095,437) which introduce a stream of air to the fuel via the adapter, with nitrous injection (see, e.g., U.S. Pat. Nos. 6,997,401, 7,533,661) which introduce a stream of nitrous to the fuel via the adapter, gaseous dual fuel injection systems (see, e.g., U.S. Pat. No. 9,038,599) which introduce methane, propane or a form of natural gas into the fuel stream via the adapter; or with surface collision injection mechanisms (see, e.g., U.S. Pat. Nos. 4,925,110, 4,982,716, 5,301,879) which collide a fuel stream with a surface within the adapter, is well practiced in the art of port fuel injector modification. However, these existing fuel injector adapters are typically applied to low pressure fuel injection systems and, furthermore, are typically applied to fuel injectors located in the intake track of an internal combustion engine.

Therefore, a new approach for the modification of a conventional gasoline direct injector is provided by various embodiments of the present invention. This new approach provided by various embodiments of the present invention maintains high precision of the conventional direct injector assembly while permitting modifications in fuel flow and matching of the appropriate in-cylinder spray plume to the application engine combustion chamber.

SUMMARY OF THE DISCLOSURE

Disclosed herein is a method for modification of a conventional gasoline direct injector to change the flow rate and/or spray pattern, wherein the method includes machining of the conventional direct injector (sometimes referred to herein as "piece 1"), and the design and assembly of an adapter (sometimes referred to herein as "piece 2") to the machined direct injector, which adapter reinforces the conventional direct injector valve (pintle and seat), and provides a surface for assembly of an orifice plate (sometimes referred to herein as "piece 3"), which orifice plate can be designed to the desired specification of flow rate and spray pattern for a given engine application.

In one embodiment, disclosed is a modified conventional direct injector that produces a specific fuel flow rate and fuel spray plume. This embodiment is an assembly of three pieces, which include the conventional direct injector (piece 1), a modular adapter (piece 2) and an orifice plate (piece 3). In this embodiment, the conventional direct injector with a proximal end through which fuel enters and a distal end through which fuel exits a nozzle, is machined with a specific profile at the proximal end. The profile includes an axial surface, a conical section, a short cylindrical section and a longitudinal outboard shoulder. In this embodiment, the machined conventional injector is assembled to a modular adapter with a proximal end and a distal end, which modular adapter is manufactured to a specific section on the proximal end. The modular adapter includes a central hole, an axial face extending from the central hole, a conical section and a cylindrical shoulder, wherein the specific section at the proximal end is dimensioned and toleranced to marry specifically with the distal end of the machined conventional injector. The distal end of the modular adapter contains a specific section which includes a cylindrical fluid cavity extending outward from the central hole, and an outer shoulder which extends from the cavity to the outer diameter of the modular adapter. In this embodiment, an orifice plate with a proximal end and a distal end is assembled to the longitudinal face of the outer shoulder at the distal end of the modular adapter.

In another embodiment, disclosed is a modified conventional direct injector that produces a sub-assembly that flows a high volume of fluid through a central hole and provides a surface for the assembly thereto of an orifice plate (which orifice plate may be attached at a future time after manufacture of the direct injector sub-assembly). This embodiment is an assembly of two pieces, which include the conventional direct injector (piece 1) and a modular adapter (piece 2). In this embodiment, the conventional direct injector with a proximal end through which fuel enters and a distal end through which fuel exits a nozzle, is machined with a specific profile at the proximal end. The profile includes an axial surface, a conical section, a short cylindrical section and a longitudinal outboard shoulder. In this embodiment, the machined conventional injector is assembled to a modular adapter with a proximal end and a distal end, which modular adapter is manufactured to a specific section on the proximal end. The modular adapter includes a central hole, an axial face extending from the central hole, a conical section, and a cylindrical shoulder, wherein the specific section at the proximal end is dimensioned and toleranced to marry specifically with the distal end of the machined conventional injector. The distal end of the modular adapter contains a specific section which includes a cylindrical fluid cavity extending outward from the central hole, and an outer shoulder which extends from the cavity to the outer diameter of the modular adapter. In this embodiment, the outer shoulder of the modular adapter distal end provides a surface having specific dimensions and tolerances which allow the mounting of an orifice plate thereto.

BRIEF DESCRIPTION OF THE DRAWINGS

These and other features, aspects, and advantages of the present invention will become better understood with regard to the following description, appended claims, and accompanying drawings (some of the drawings may be not drawn to scale and some of the drawings may be drawn at the indicated scale; further, where scale and/or dimensions are provided, they are provided as examples only) wherein:

DETAILED DESCRIPTION OF DISCLOSURE

Detailed embodiments of the present disclosure are described herein; however, it is to be understood that the disclosed embodiments are merely illustrative of the compositions, structures and methods of the disclosure that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the compositions, structures and methods disclosed herein. References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment.

For the purposes of describing and claiming the present invention the term "proximal" is intended to refer to being at, facing and/or closer to an end of an injector to which fluid is input.

For the purposes of describing and claiming the present invention the term "distal" is intended to refer to being at, facing and/or closer to an end of an injector from which fluid is ejected.

One aspect of the disclosure provides a modified direct injector for injecting liquids into reciprocating or rotary internal combustion engines. Such liquids include, but are not limited to, fuels, water and/or aqueous solutions. When the modified injector is in use, it may utilize an orifice plate, assembled to the distal end of the modified injector assembly, to inject liquid to the desired target and at the desired flow rate and desired spray pattern.

The modified injector assembly, according to an aspect of the disclosure, provides a mechanism for modifying the flow rate and spray pattern of an existing conventional direct injector. For example, an original existing injector can be purchased which has a static flow rate of 14.4 g/sec. Said injector can be modified according to the disclosure to obtain a static flow rate of 21.7 g/sec, and to maintain the original existing injector fuel spray pattern and installation requirements. The new modified injector of this example delivers more fuel within the same injection timing duration commanded by the ECU, and when accompanied by proportionally increased air flow, will result in higher specific output than obtained with the original existing injector. In another example, the flow rate may be unchanged and the spray pattern may be changed. In another example, both the flow rate and the spray pattern may be changed.

Figure 4:
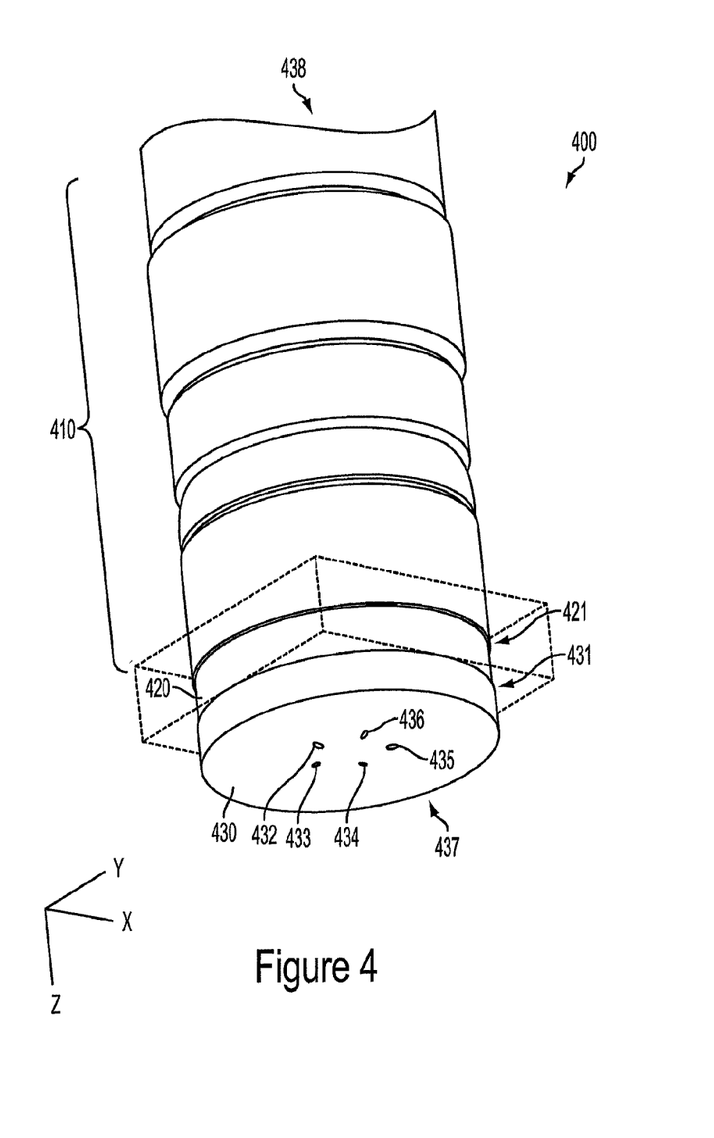
FIG. 4 is a rendering of a modified direct injector assembly according to an embodiment of the disclosure (this FIG. 4 shows a distal end of the modified direct injector, a mounting adapter and an orifice plate).

FIG. 4 is a view of the distal end of an embodiment of a modified injector assembly 400 with a machined injector 410, a modular adapter 420, and an orifice plate 430. The distal end of the machined injector 410 is assembled to the proximal end of the adapter 420. Each of the distal end of the machined injector 410 and the proximal end of the modular adapter 420 has a specific design section to, in essence, guarantee the fit and durability of the pintle ball seal inside the machined injector 410. The machined injector 410 and the modular adapter 420 may be welded or otherwise mechanically bonded together at joint 421. Orifice plate 430 is assembled to the distal end of the modular adapter 420. The orifice plate 430 and the modular adapter 420 may be welded or otherwise mechanically bonded together at joint 431. Fluid flows freely from the proximal end 438 of the machined injector 410, through the injector to the distal end thereof, where the pintle ball valve controls flow to a central hole through the proximal end of the modular adapter 420. The fluid further flows though the central hole of the modular adapter 420 into a cylindrical fluid cavity in the distal end of the modular adapter 420. The fluid is then available to flow through the passage(s) of the orifice plate 430. In this embodiment, an orifice plate 430 is provided with 5 holes (432, 433, 434, 435, and 436) at the distal end 437 of the modified injector assembly 400.

Figure 5:
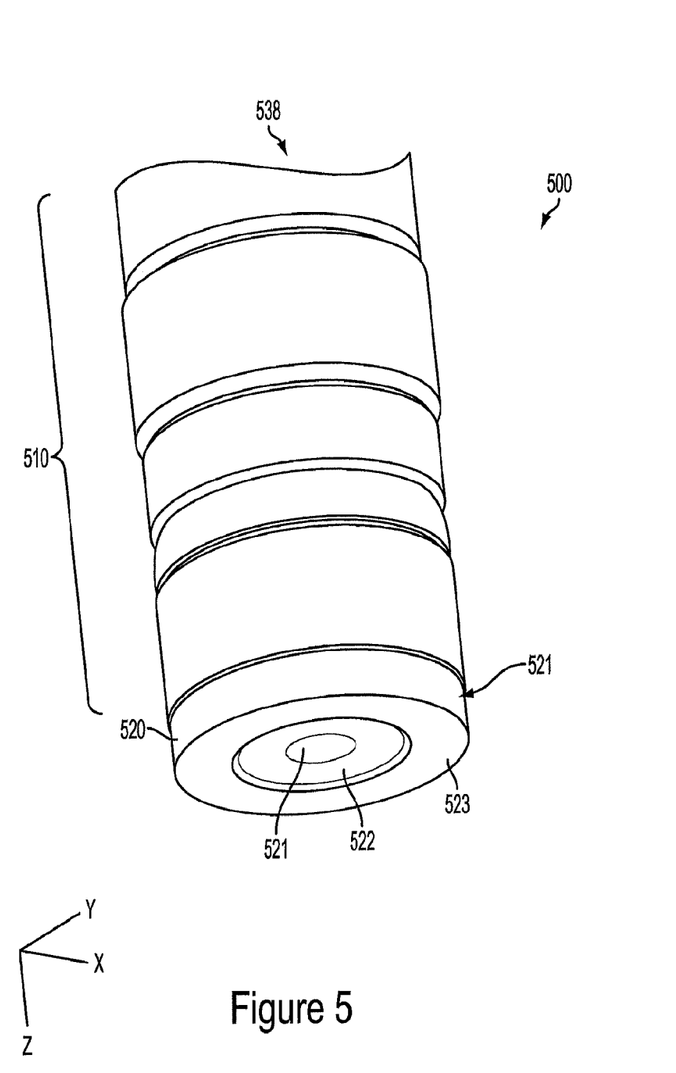
FIG. 5 is a rendering of a modified direct injector according to an embodiment of the disclosure (without the orifice plate).

FIG. 5 is a view of the distal end of an embodiment of a modified injector assembly 500 with a machined injector 510 and a modular adapter 520. The distal end of the machined injector 510 is assembled to the proximal end of the modular adapter 520. Each of the distal end of the machined injector 510 and the proximal end of the modular adapter 520 has a specific design section to, in essence, guarantee the fit and durability of the pintle ball seal inside the machined injector 510. The machined injector 510 and the modular adapter 520 may be welded or otherwise mechanically bonded together at joint 521. Fluid flows freely from the proximal end 538 of the machined injector 510, through the injector to the distal end thereof, where the pintle ball valve controls flow to a central hole through the proximal end of the modular adapter 520. The fluid further flows though the central hole 521 of the modular adapter and into a cylindrical fluid cavity 522 in the distal end of the modular adapter 520. The modular adapter 520 provides a surface 523 for the installation of an orifice plate or nozzle for the delivery of a fluid.

A critical aspect of the high pressure direct injector design is the pintle ball and nozzle seat seal, internal to the distal end of the direct injector. Dimensions and tolerances of the specific features of the machined direct injector are designed to increase the cross sectional area of the fluid flow passages (e.g., output orifices) of the original direct injector without impacting or damaging the integrity of the pintle seat in the original conventional direct injector. Various disclosed embodiments are specified with dimensions and tolerances to ensure the modular adapter is always supporting substantially, in mechanical contact with, the machined surface of the direct injector below the internal pintle seat section, assuring integrity and durability comparable to the original injector. In one embodiment, the modular adapter provides 360 degrees of structural support to the machined injector pintle seat (wherein the structural support is provided from the contact surface through the adapter to the weld of the adapter to the machined injector). By way of example, Finite Element Analysis of the disclosed assembly demonstrated a maximum deflection less than 2.9 microns (0.0029 mm) with applied stress from 345 Bar (5,000 psi) of internal fluid pressure acting on the pintle ball and seat.

Figure 6:
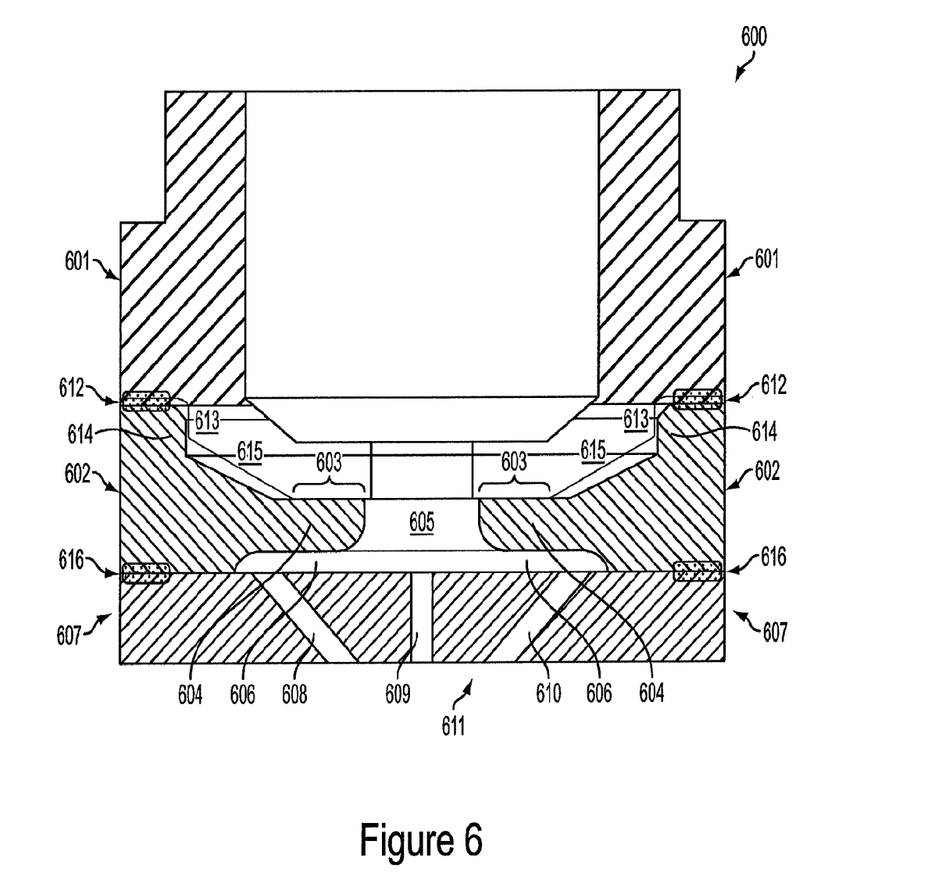
FIG. 6 is a sectional view of a modified direct injector assembly according to an embodiment of the disclosure (this FIG. 6 shows a distal end of the modified direct injector, a mounting adapter and an orifice plate).

FIG. 6 is a sectional view of the distal end of a modified direct injector assembly 600 of an embodiment. Machined direct injector 601 is in direct mechanical communication with modular adapter 602 through surface contact at face 603. The contact surface between the machined injector 601 and the modular adapter 602 is supported by the seat bridge section 604, which supports 360 degrees of the contact surface 603, while still allowing fluid flow through the central hole 605 (that is, the central hole in the modular adapter 602). The machined injector 601 and adapter 602 are, in this embodiment, welded or otherwise mechanically bonded, 360 degrees around the outer circumference, at joint 612, which joint may have an acceptable gap from about 5 micrometers to about 200 micrometers when the surfaces 603 and seat bridge section 604 are in contact. The machined injector 601 has pilot diameter 613, which can range from about 3.2 mm to about 7 mm diameter, which pilot diameter provides axial alignment to the pilot bore 614 of the modular adapter 602. The nominal radial gap between adapter surface 614 and machined injector surface 613 can range from about 5 micrometers to about 250 micrometers, corresponding to a range of embodiments with assembly fit ranging from interference fits to loose fits between the machined injector and the adapter. The relationship between diameter 613 and 614 can range from as small as about 1.0:1.003 up to as large as about 1.0:1.2. It should be noted that in this embodiment there is no rigid contact or structural communication present between the modified injector 601 and the modular adapter 602 at the interior cone 615. Fluid flows into cavity 606 (of modular adapter 602) and is presented to the interior end of an orifice plate 607. In this embodiment, orifice plate 607 is welded or otherwise mechanically bonded 360 degrees around the outer circumference to the adapter 602 at joint 616. The fluid presented to the orifice plate 607 from the cavity 606 flows through a plurality of orifices (608, 609, 610 . . . ) and exits the distal end 611 of the modified injector.

Figure 7:
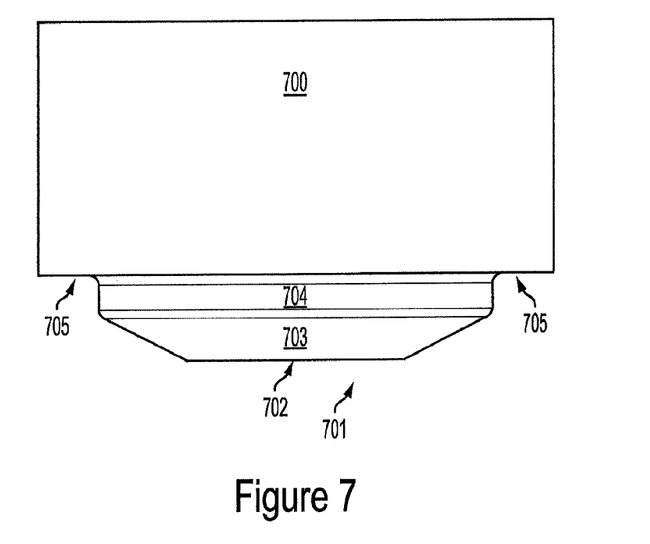
FIG. 7 illustrates the machining of a conventional direct injector according to an embodiment of the disclosure.

FIG. 7 is a rendering of a machined injector 700 of an embodiment. The distal end 701 of the machined injector 700 is shown in the rendering. In this image the machined surfaces of the injector nozzle at the distal end can be seen. The nozzle tip has been removed to create seat surface 702, which seat surface 702 is a substantially circular area, above which surface, and inside injector 700, resides the pintle ball seat and seal. The seat surface 702 transitions outwardly to the clearance cone 703, which clearance cone 703 blends smoothly to the pilot diameter 704. The cylindrical surface of pilot diameter 704, which is substantially perpendicular to the seat surface 702, transitions smoothly to the weld face 705, which is substantially parallel to seat surface 702. The machined portions of the injector 700 comprising seat surface 702, clearance cone 703 and pilot diameter 704 are examples of what is sometimes referred to herein as a "male interface"). The nominal axial distance between seat surface 702 and weld face 705 may range from about 0.35 mm to about 2 mm, in various embodiments, with a total tolerance of about 50 micrometers. The nominal dimension of pilot diameter 704 may range from about 3.2 mm to about 7 mm, in various embodiments, with a total tolerance of about 100 micrometers.

Specific dimensions of the injector machined surfaces, both relative to each other and relative to the original direct injector body, are designed for each type of injector for the particular injectors from component manufacturers, which may include, but are not limited to, by way of example: Robert Bosch GmbH, Denso, Delphi Inc., Continental GmbH, and Magneti Marelli SpA.

Figure 8:
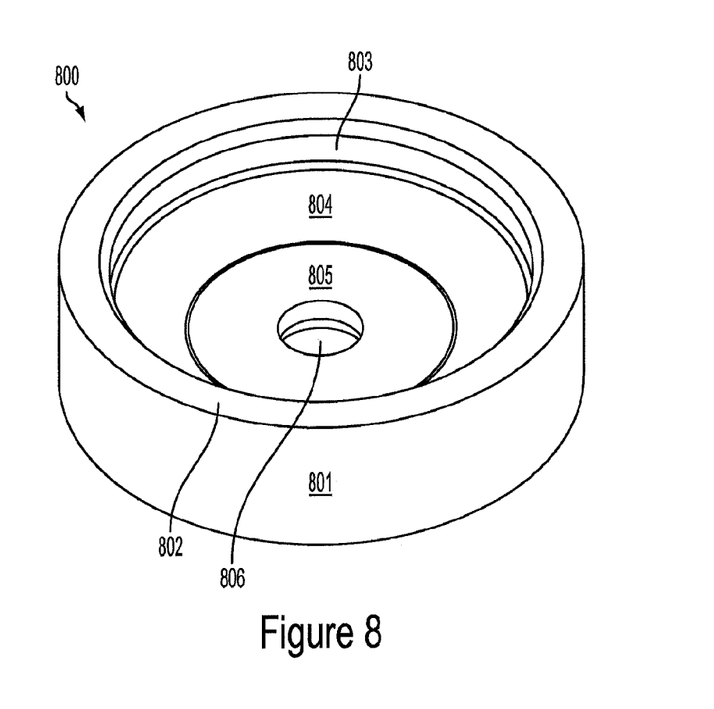
FIG. 8 illustrates a modular adapter according to an embodiment of the disclosure.

FIG. 8 is an isometric rendering of a modular adapter of an embodiment. This FIG. 8 illustrates the inner surfaces of the modular adapter which integrate to the machined injector, previously described in connection with FIG. 7. Modular adapter 800 of this embodiment is of cylindrical and radially symmetrical shape, with outer diameter 801. Outer diameter 801 is adjacent to top surface 802, which top surface 802 is also called the weld shoulder. Modular adapter 800 is, in this embodiment, mechanically connected to the machined injector at the weld shoulder 802, after assembly thereto. Inside the modular adapter 800, from the topmost surface downward, inside diameter 803 forms the pilot bore, conical surface 804 forms the clearance cone, surface 805 forms the seat support surface, and central hole 806 is the primary fluid passage bore. Pilot diameter 803 provides radial location of the modular adapter 800 relative to the machined injector. Seat support surface 805 provides axial location of the modular adapter 800 to the machined injector as well as provides structural support to the injector internal seat and pintle. Passage 806 provides a fluid channel for the flow of fluid outward therefrom. Weld shoulder 802 provides structural support to the seat support surface 805 via the conical surface 804. The portions of the modular adapter 800 comprising seat support surface 805, conical surface 804 and inside diameter 803 are examples of what is sometimes referred to herein as a "female interface").

Figure 9:
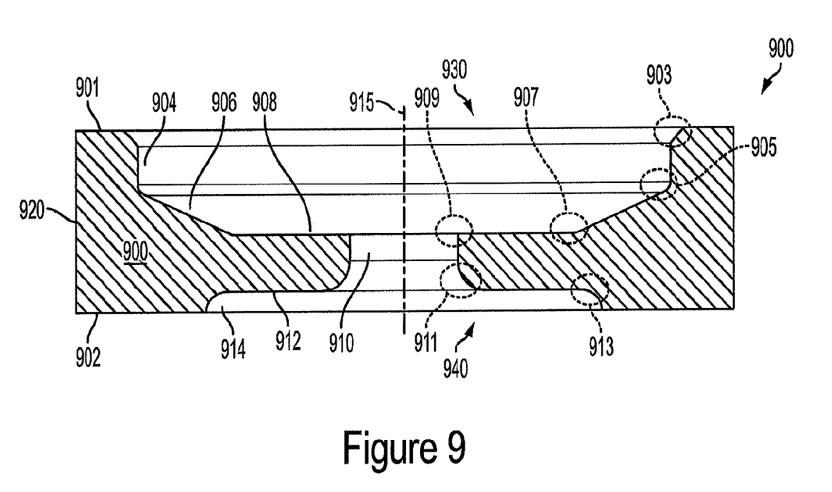
FIG. 9 illustrates a sectional view of a modular adapter according to an embodiment of the disclosure.

FIG. 9 is a cross section illustration of a modular adapter of an embodiment. This FIG. 9 illustrates the radially symmetrical design features of the modular adapter. Modular adapter 900 of this embodiment has outside diameter 920, which diameter can range from about 6 mm to about 8 mm, and is oriented with proximal end 930 and distal end 940, wherein modular adapter 900 is in material connection with a machined injector at the proximal end 930. Fluid flows into the proximal end 930 and out at the distal end 940. Surface 901, also referred to as the weld shoulder, is at the proximal end and is perpendicular to the central longitudinal axis 915 of the modular adapter 900. Cylindrical surface 904 is of smaller diameter than outside diameter 920, which smaller nominal diameter may range from about 4 mm to about 6 mm, wherein the relationship between diameter 920 and 904 can range from about 1:0.4 to about 1:0.8, and surface 904 extends downward from the weld shoulder 901, wherein this embodiment utilizes a chamfer lead 903 between the surface 901 and the cylindrical surface 904. Cylindrical surface 904 is also referred to as the pilot bore. Pilot bore 904 extends downward to conical surface 906, which conical surface extends inward toward the central longitudinal axis 915 and downward toward surface 908. In this embodiment, surfaces 904, 906 and 908 blend smoothly from one to another with blend radii 905 and 907, which radii are commonly used in design to relieve stress at the surface intersections. Surface 908 is perpendicular to the central longitudinal axis 915 of the modular adapter 900 and extends inward toward central hole 910. Surface 908 is also referred to as the seat support surface and hole 910 is also referred to as the primary fluid passage or the fluid passage bore, which extends from surface 908, downward on the central longitudinal axis 915 toward the distal end 940. The nominal axial dimension between surface 908 and surface 901 may range from about 0.3 mm to about 1.7 mm, in various embodiments, with a total tolerance of about 30 micrometers. Seat support surface 908 and central bore 910, in this embodiment, form about a 90 degree corner 909. Central bore 910 flows fluid downward toward the fluid cavity formed by surface 912 (which is perpendicular to the central longitudinal axis 915) and extends outward toward diameter 914. Surfaces 910, 912 and 914, in this embodiment, are blended together with generous radii 911 and 913, where radius 911 blends the outside surface of the central bore 910 to the fluid cavity ceiling 912, which surface 912 is perpendicular to the central longitudinal axis 915 in this embodiment, and surface 912 is blended smoothly with radius 913 to the cavity diameter 914. The cavity diameter 914 intersects the lower surface 902 of the modular adapter 900 at the distal end 940. The lower surface 902 is substantially perpendicular to the central longitudinal axis 915 and extends outward fully to outside diameter 920. The portions of the modular adapter comprising seat support surface 908, pilot bore 904 and conical surface 906 are examples of what is sometimes referred to herein as a "female interface").

Figure 10A:
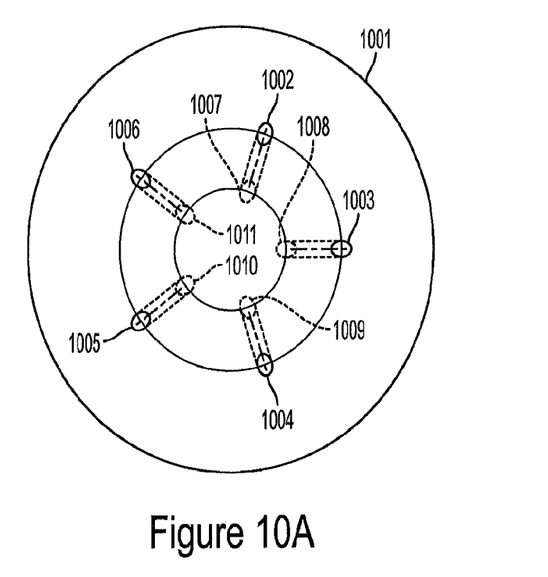
FIGS. 10A and 10B illustrate, respectively, a plan view and an isometric view of an example orifice plate according to an embodiment of the disclosure.
Figure 10B:
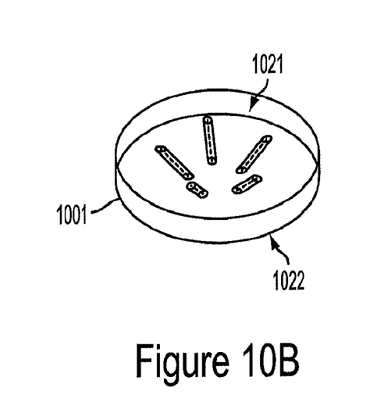

FIGS. 10A and 10B illustrate two views of an example orifice plate according to an embodiment of this disclosure. The plan view (FIG. 10A) of the proximal end of orifice plate 1001 illustrates a circular plate with five orifices 1002, 1003, 1004, 1005, 1006 on the proximal face, which orifices pass through the thickness of the orifice plate 1001 and each corresponding holes 1007, 1008, 1009, 1010, and 1011 exit at the distal face. The isometric view (FIG. 10B) illustrates the same example orifice plate 1001 with orifice holes (shown in phantom) passing from the proximal end 1021 to the distal end 1022.

Variations in the modified direct injector are contemplated by the present invention. The following is a listing of some variations. The direct injector of the present invention may include one or a combination of the modifications outlined below.

With reference to FIG. 9, in an alternative embodiment, the weld shoulder 901 is not substantially perpendicular to the longitudinal axis, instead, the weld shoulder 901 may be conical with an angle less than 90 degrees to the longitudinal axis.

With reference to FIG. 9, an alternative embodiment may not have a chamfer 903, but may have a radii or sharp corner of 90 degrees.

With reference to FIG. 9, an alternative embodiment may not have an internal conical surface 906, but, instead, surface 904 extends downward to intersect surface 908, which surface 908 is extended outward to the diameter of cylindrical surface 904.

With reference to FIG. 9, an alternative embodiment may have a surface 908 which is conical rather than perpendicular to longitudinal axis 915, but is at a specified angle to the longitudinal axis, and may or may not be the same angle as surface 906.

With reference to FIG. 9, an alternative embodiment may have a pilot bore 904 which is dimensioned to provide a press or interference fit to the machined injector.

With reference to FIG. 9, an alternative embodiment may have a surface 906 which is a radius or is arc section rather than flat or conical section.

With reference to FIG. 9, an alternative embodiment may have a surface 908 which extends completely to the outside diameter 920, thereby eliminating features 901, 903, 904, 905, and 906. In this alternative embodiment, surface 908 interacts directly with the machined injector to provide structural support and mechanical connection to the machined injector.

With reference to FIG. 9, an alternative embodiment may have a central passage 910 which is a section other than circular, which may be a vertical passage of any polygonal or free hand section.

With reference to FIG. 9, an alternative embodiment may have more than one central vertical passage, where multiple passages extend from surface 908 to 912, which passages may or may not be parallel to the longitudinal axis and are less than 75 degrees to the longitudinal axis 915.

With reference to FIG. 9, an alternative embodiment may have a feature 913 which is other than a radius, which feature may be a right angle, compound angle or any free hand section.

With reference to FIG. 9, an alternative embodiment may have a feature 913 which is of parabolic or "s" section, which feature extends completely to feature 911, creating a generally smooth curve section which minimizes any surface substantially perpendicular to the longitudinal axis.

With reference to FIG. 9, an alternative embodiment may have a feature 911 which is angular, such as a right angle or a compound angle.

With reference to FIG. 9, an alternative embodiment may have a lower cavity formed by surfaces 912 and 914 which is not cylindrical in shape, but any polygonal or free hand shape when viewed axially from the distal end.

With reference to FIG. 9, an alternative embodiment may have a lower cavity formed by surfaces 912 and 914 which is formed by channels or grooves which extend outward radially from the center longitudinal axis toward the cavity diameter 914, which grooves vary in number according to the number of passages present in an orifice plate, and which grooves may be of polygonal, circular or elliptical in section.

With reference to FIG. 9, an alternative embodiment may not have a lower cavity, where surface 912 extends completely radially outward toward diameter 920, and features 913 and 914 do not exist.

With reference to FIG. 9, an alternative embodiment may have a main central passage 910 which eliminates the cylindrical cavity 912-913-914, and provides the function to supply fluid to a plurality of exit orifices. In this alternative embodiment, the main central passage 910 extends to, but not through, distal surface 902. There are then a plurality of small orifice holes that extend outward and downward from this central passage 910 toward the distal end 940, through which plurality of small orifice holes the fluid flows outward from the adapter face 902. This embodiment integrates the function of an additional orifice plate into the adapter, eliminating the need for a secondary component.

With reference to FIG. 9, an alternative embodiment may not be radially symmetrical and where the adapter 900 requires radial orientation to the machined injector, and said adapter 900 includes a radial orientation feature, which feature is present on outward face 902 and/or outer diameter 920, and which feature may be in the form of a pin or pins, or location hole or holes, or groove or grooves, or corner notch or notches, or flat surface or surfaces on the outward face 902 and/or the outer diameter 920, or any combination thereof.

In another example, a modular adapter and/or an orifice plate may be made of any grade of carbon steel, stainless steel and/or tool steel.

In another example, a modified injector assembly is used to flow a noncombustible fluid, such as water and/or water-salt solutions.

In another example, a modified injector assembly is used with any ethanol-gasoline blends, from E5 to E95.

In another example, a modified injector assembly is used with a combustible fluid other than gasoline, including nitrous and/or ethanol.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method of modifying at least one of a fluid flow rate and a fluid spray pattern of an existing high pressure injector, the existing high pressure injector having a proximal end and a distal end, the existing high pressure injector having at the proximal end an input configured to receive fluid and having at the distal end a nozzle configured to eject the fluid, the nozzle including at least one orifice, wherein the orifice is in fluid communication with the input via a valve, wherein the valve comprises a valve seat and a pintle ball, and wherein a bottom portion of the pintle ball is configured to seal against a top surface of the valve seat, the method comprising:

removing material from the distal end of the existing high pressure injector, wherein the removal of the material removes at least the orifice of the nozzle and exposes a bottom surface of the valve seat, and wherein the removal of the material provides at the distal end of the existing high pressure injector a male interface;

providing a mounting adapter having a proximal end and a distal end, the proximal end of the mounting adapter having a female interface configured to mate with the male interface, the mounting adapter having a fluid channel disposed between the proximal and distal ends of the mounting adapter, the fluid channel being in fluid communication with the input via the valve, and the mounting adapter having in the female interface a seat support surface configured to support the bottom surface of the valve seat via contact therewith, said mounting adapter having a cavity adjacent the distal end thereof, the cavity being in fluid communication with the fluid channel of the mounting adapter;

attaching the mounting adapter to the distal end of the existing high pressure injector after removal of the material, wherein the mounting adapter is attached such that the male interface is disposed within the female interface and such that the seat support surface supports the bottom surface of the valve seat via contact therewith providing an orifice plate having a proximal end and a distal end, the orifice plate including at least one plate orifice, the plate orifice being disposed between the proximal and distal ends of the orifice plate;

and attaching the orifice plate to the distal end of the mounting adapter, wherein the orifice plate is attached such that the at least one plate orifice is in fluid communication with the fluid channel of the mounting adapter, wherein, when the orifice plate is attached to the mounting adapter, the cavity of the mounting adapter is disposed between the at least one plate orifice and the fluid channel of the mounting adapter such that the at least one plate orifice is in fluid communication with the fluid channel of the mounting adapter via the cavity of the mounting adapter.

2. The method of claim 1, further comprising:

providing an orifice plate having a proximal end and a distal end, the orifice plate including at least one plate orifice, the plate orifice being disposed between the proximal and distal ends of the orifice plate;

and attaching the orifice plate to the distal end of the mounting adapter, wherein the orifice plate is attached such that the at least one plate orifice is in fluid communication with the fluid channel of the mounting adapter.

3. The method of claim 2, wherein the mounting adapter has a cavity adjacent the distal end thereof, the cavity being in fluid communication with the fluid channel of the mounting adapter.

4. The method of claim 3, wherein, when the orifice plate is attached to the mounting adapter, the cavity of the mounting adapter is disposed between the at least one plate orifice and the fluid channel of the mounting adapter such that the at least one plate orifice is in fluid communication with the fluid channel of the mounting adapter via the cavity of the mounting adapter.

5. The method of claim 1, wherein the fluid flow rate of the existing high pressure injector is modified by the method.

6. The method of claim 1, wherein the fluid spray pattern of the existing high pressure injector is modified by the method.

7. The method of claim 1, wherein the fluid flow rate and the fluid spray pattern of the existing high pressure injector are modified by the method.

8. The method of claim 1, wherein the existing high pressure injector is a gasoline direct injector.

9. The method of claim 1, wherein the material is removed via at least one of: (a) machining; (b) grinding; and (c) any combination thereof.

10. The method of claim 1, wherein the seat support surface is in contact with at least a portion of the bottom surface of the valve seat.

11. The method of claim 1, wherein the seat support surface is in contact with substantially the entire bottom surface of the valve seat.

12. The method of claim 1, wherein a portion of the male interface is disposed within the female interface.

13. The method of claim 1, wherein substantially the entire male interface is disposed within the female interface.

14. The method of claim 1, wherein the mounting adapter is attached to the existing high pressure injector, after removal of the material, via an interference fit.

15. The method of claim 14, wherein the interference fit is between at least a portion of an inner surface of the female interface and at least a portion of an outer surface of the male interface.

16. The method of claim 1, wherein the mounting adapter is attached to the existing high pressure injector, after removal of the material, via a weld provided by a welding operation.

17. The method of claim 16, wherein the weld is around substantially an entire outer circumference of the mounting adapter.

18. The method of claim 1, wherein the mounting adapter is formed via at least one of: (a) machining; (b) casting; and (c) any combination thereof.

19. The method of claim 2, wherein:
the at least one plate orifice comprises a plurality of plate orifices;
each of the plurality of plate orifices is disposed between the proximal and distal ends of the orifice plate; and
the orifice plate is attached such that the plurality of plate orifices are in fluid communication with the fluid channel of the mounting adapter.

20. The method of claim 2, wherein the orifice plate is attached to the mounting adapter via a weld provided by a welding operation.

21. The method of claim 20, wherein the weld is around substantially an entire outer circumference of the orifice plate.

22. The method of claim 2, wherein the orifice plate is formed via at least one of: (a) machining; (b) casting; and (c) any combination thereof.

23. The method of claim 2, wherein the following steps are carried out in the following order: removing material, attaching the mounting adapter, and attaching the orifice plate.

24. The method of claim 2, wherein the following steps are carried out in the following order: removing material, attaching the orifice plate to the mounting adapter, and attaching the mounting adapter.

25. The method of claim 2, wherein the following steps are carried out in the following order: attaching the orifice plate to the mounting adapter, removing material, and attaching the mounting adapter.

26. A high pressure injector, comprising:
an input disposed at a proximal end of the injector, the input being configured to receive a fluid;
a valve in fluid communication with the input, wherein the valve comprises a valve seat
and a pintle ball, wherein the valve seat comprises a top surface and a bottom surface, and wherein a bottom portion of the pintle ball is configured to seal against the top surface of the valve seat;
a mounting adapter having a proximal end and a distal end, the proximal end of the mounting adapter having a female interface that mates with a male interface located at the bottom surface of the valve seat, the mounting adapter having a fluid channel disposed between the proximal and distal ends of the mounting adapter, the fluid channel being in fluid communication with the input via the valve, and the mounting adapter having in the female interface a seat support surface configured to support the bottom surface of the valve seat via contact therewith, and
an orifice plate having a proximal end and a distal end, the orifice plate comprising a plurality of plate orifices, the plate orifices being disposed between the proximal and distal ends of the orifice plate;
wherein the orifice plate is attached to the distal end of the mounting adapter such that the plurality of plate orifices are in fluid communication with the fluid channel of the mounting adapter,
wherein the mounting adapter has a cavity at the distal end thereof, the cavity being in fluid communication with the fluid channel of the mounting adapter,
wherein the cavity of the mounting adapter is disposed between the plurality of plate orifices and the fluid channel of the mounting adapter, such that the plurality of plate orifices are in fluid communication with the fluid channel of the mounting adapter via the cavity of the mounting adapter, and
wherein extension lines of the plurality of plate orifices converge to create a focal point where the fluid passing through the plurality of plate orifices impinges one another at the focal point.

27. The injector of claim 26, wherein the injector is a gasoline direct injector.

28. The injector of claim 26, wherein the seat support surface is in contact with at least a portion of the bottom surface of the valve seat.

29. The injector of claim 26, wherein the seat support surface is in contact with substantially the entire bottom surface of the valve seat.

30. The injector of claim 26, wherein a portion of the male interface is disposed within the female interface.

31. The injector of claim 26, wherein substantially the entire male interface is disposed within the female interface.

32. The injector of claim 26, wherein:
each of the plurality of plate orifices is disposed between the proximal and distal ends of the orifice plate; and the orifice plate is disposed relative to the mounting adapter such that the plurality of plate orifices are in fluid communication with the fluid channel of the mounting adapter.

* * * * *